Sept. 13, 1966  H. S. PEACOCK ETAL  3,272,157
CLAMP STRUCTURES AND DISPLAY UNITS EMBODYING SAME
Filed May 10, 1965
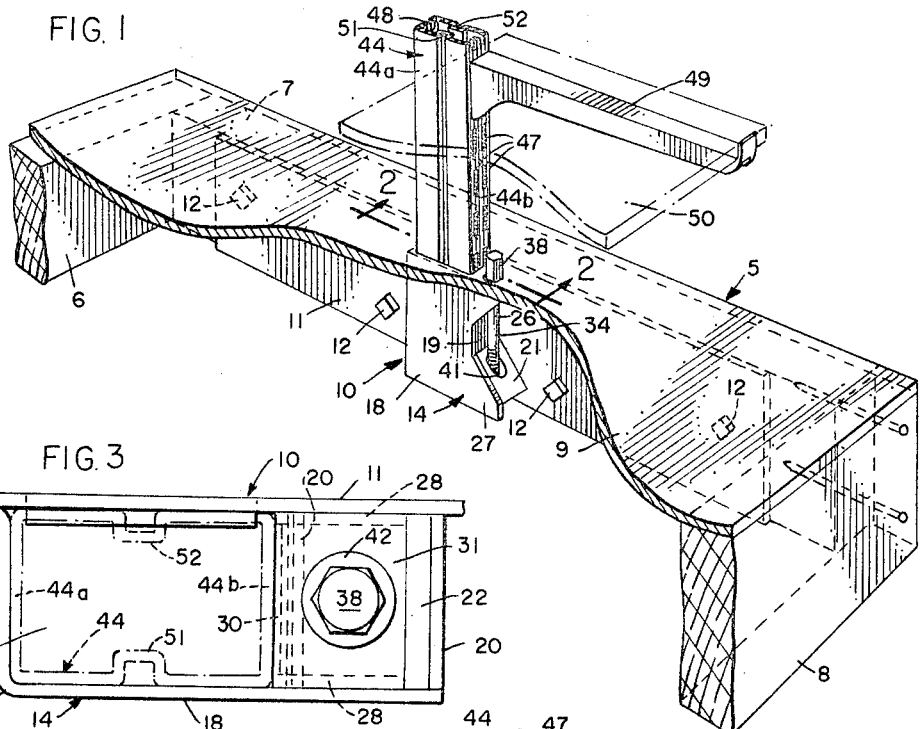
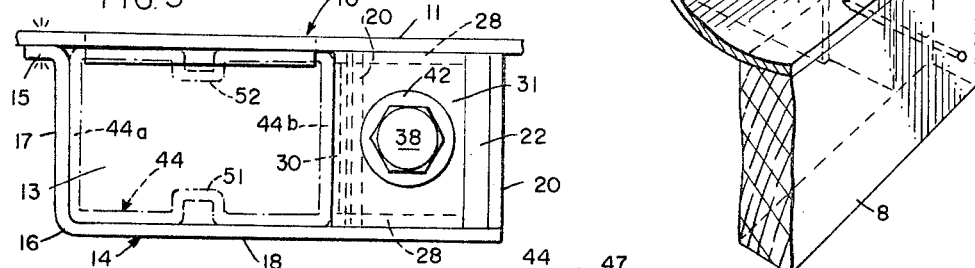
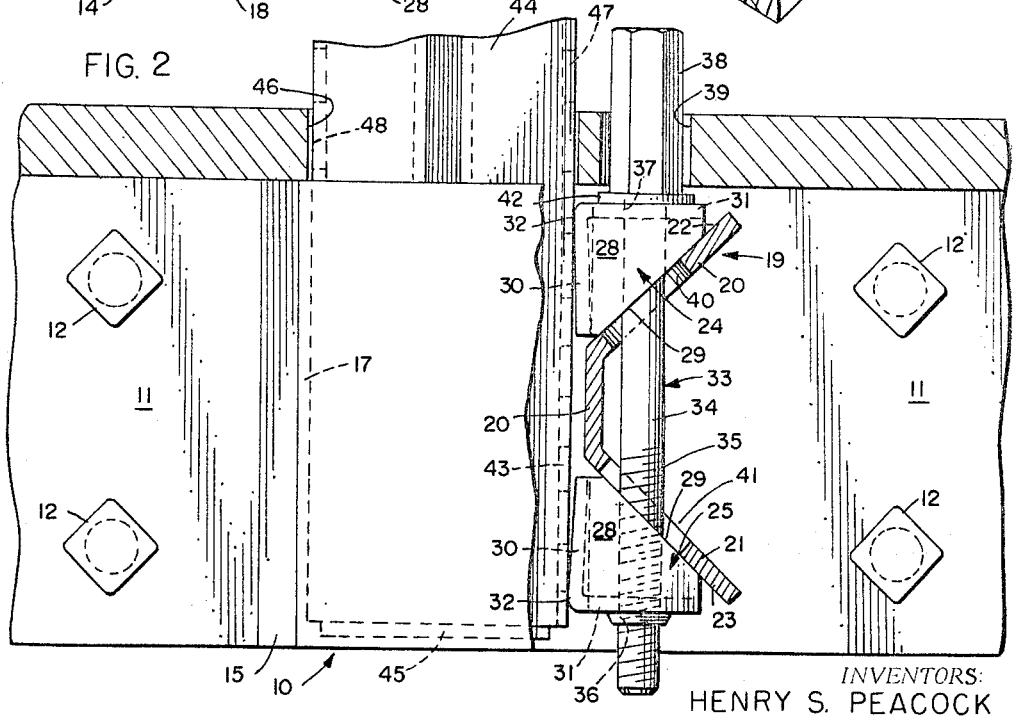
INVENTORS:
HENRY S. PEACOCK
CHARLES P. DURHAM
BY: Marzall, Johnston, Cook & Root
ATT'YS United States Patent Office 3,272,157
Patented Sept. 13, 1966

3,272,157
CLAMP STRUCTURES AND DISPLAY UNITS
EMBODYING SAME
Henry S. Peacock and Charles P. Durham, Lincoln, Ill., assignors to Swain & Myers, Inc., Decatur, Ill., a corporation of Delaware
Filed May 10, 1965, Ser. No. 454,526
6 Claims. (Cl. 108—28)

This invention in general relates to clamp structures having converging, oppositely-facing, clamping jaw guides with clamping jaws slidably mounted thereon. The invention also pertains to movable, pallet display structures having one or more vertical posts removably clamped to the underframing of a pallet by clamp structures of the invention.

Movable pallets are versatile display devices because they can be moved from place to place in a store or the like when merchandising displays are changed, departments are rearranged and the like. A type of pallet embraced by the invention is one having a pallet base with one or more vertical posts removably supported thereon. The post or posts, in turn, support display shelves, which preferably are removably and adjustably supported on the posts by shelf brackets or the like. The preferred form of post is a hollow, metal post having a plurality of vertical slots in one or more vertical rows for receiving mounting ears or tabs on shelf brackets.

Briefly, the clamp structures comprise side walls defining a socket open at a longitudinal end thereof. It is constructed to receive a rod-like member, e.g., a shelf support post, through the longitudinal end in a fairly close, though easily slidable, fit when the clamping jaws are open. One of the side walls embodies a pair of longitudinally spaced, converging, oppositely facing, clamping jaw guides, each having a clamping jaw slidably mounted thereon for angular, sliding movement of the jaws toward each other as the jaws move inwardly into the socket toward rod-clamping position and away from each other as the jaws move out of the socket.

The jaws are activated between rod-clamping position and non-clamping position by exerting a force to draw them together for clamping and by releasing the last-mentioned force through either positively spreading or merely allowing them to spread sufficiently through release of the draw-together, clamping force. As the jaws are drawn together by a force parallel to the longitudinal axis of the socket, they slide on their respective, converging guide and thereby move the jaws into the socket against the post or other rod-like member to be clamped releasably in the socket.

For supporting a vertical post such as a post mounted on a display pallet, the clamp socket axis is vertical. It has vertical side walls defining a vertical socket open at the upper end. One of the side walls of the socket has an upwardly-and-outwardly-sloping, clamping jaw guide and a downwardly-and-outwardly-sloping, clamping jaw guide providing a pair of oppositely-facing, jaw guides. The respective clamping jaws are activated to slide along the guides toward clamping position by a mechanical force drawing them together, the best form of which is a rotatable screw drive operatively connected to both jaws and threadedly connected to at least one jaw. The screw drive may consist of a rotatable shaft with threads of opposite hand threadedly connected to respective jaws, or it may be a bolt with its shank extending through both of said jaws, means threadedly connecting one end of said bolt and one of said jaws, and the other end of said bolt having a portion rotatable in and bearing against the other of said jaws as the threading action draws the jaws toward each other.

In a simply constructed, preferred form of the invention, the jaw guides are plates respectively having elongated slots extending in the direction of jaw movement on the respective jaw plates. The shaft or shank of the screw drive extends through the jaws and the slots, the latter allowing sliding movement of the jaws on the guides without binding by the shafts or shanks of the screw drive.

The movable pallet, display structure is a combination of a pallet having underframing supporting a platform. One or more vertical, shelf-supporting posts are releasably mounted in respective socket structures supported on the underframing. The clamping structures of the invention are well suited for use in this combination because the socket assembly may be mounted on the underframing beneath the pallet platform and out of view except for a small portion of a screw shaft or bolt head, which protrudes slightly above the platform. This gives ready accessibility for engaging a handle, wrench or other hand tool to tighten or loosen the clamp jaws on the base of the post. Prior devices known to us for clamping such posts on pallets, if hidden from view, have had the clamp actuator inaccessible except by turning the pallet on its side.

It is an object of this invention to provide new combinations in pallet display structures embodying shelf-supporting posts wherein post-clamping, jaw structures are in hidden sockets supporting such posts and are actuated by turning a small portion of a screw drive which projects through the pallet platform near the post.

Another object is to provide rugged, readily engageable and disengageable clamp structures for rod-like members in which a pair of jaws movable in convergence and divergence releasably clamp said member in a socket.

Still another object is to provide clamp structures of rugged and simple construction with longitudinally-convergingly-and-divergingly-movable jaws on one side of a socket acting at longitudinally spaced points on a rod-like member in the socket.

Another object is to provide socket assemblies with screw-operated, longitudinally spaced jaws slidably mounted on sloping, converging, oppositely facing jaw guides, a preferred form of which is inwardly converging plates on a side wall of the socket.

These, as well as other objects, advantages and features of the invention hereinafter described, may be attained by practice of the invention according to the preferred, specific embodiment illustrated in the drawings, wherein:

FIGURE 1 is a top, perspective view of an end fragment of a movable pallet with a preferred form of socket assembly releasably clamping a vertical, shelf support post, shown in fragment, having a shelf bracket mounted thereon;

FIG. 2 is a side elevation of the socket assembly with a side wall of the socket partially broken away with the pallet platform in section along section plane 2—2 of FIG. 1; and FIG. 3 is a top plan view of the socket assembly of FIGS. 1 and 2.

Referring to the drawings, the movable pallet 5 comprises typical, wooden underframing members 6, 7, and 8 at one end thereof. The remaining underframing is similar, and is not illustrated because it is within the skill of the ordinary craftsman to provide such underframing. The underframing rests on the floor and supports a slightly elevated platform 9. The underframing and platform 9 comprise the pallet per se.

At least one socket assembly 10, and usually two or more, spaced socket assemblies 10, are fixedly mounted on the underframing beneath platform 9 and thereby are hidden from ordinary view. In a typical, small pallet structure, each end appears as illustrated in FIG. 1 wherein the socket assembly mounting plate 11 lies against the inner side of end framing member 7 and is rigidly secured thereto by wood screws or bolts 12. The plate 11 forms one side wall of a vertical, rectangular socket 13. A plate 14 has a lip 15 welded to plate 11, and it has a right angle bend 16 so as to form two additional side walls 17 and 18 of socket 13.

The fourth side of socket 13 is formed by a bent plate 19 having a center segment 20 parallel with and opposite to wall 17, an upwardly-and-outwardly-sloping wall 20 and a downwardly-and-outwardly-sloping wall 21. The outer, oppositely facing surfaces 22 and 23, respectively, of walls 20 and 21 form movable jaw guides, on which are slidably supported clamping jaws 24 and 25. These clamping jaws slide in convergence or divergence on guide surfaces 22 and 23 into and out of the socket 13. They are confined laterally by plate 11 on one side and by projecting segments 26 and 27 of plate 18 on the other side.

Each jaw is a hollow, four-sided body comprising opposite side walls 28, each having a diagonal edge 29 flatly and slidably engaged on respective guide surfaces 22 and 23. The respective side walls are joined by an essentially vertical wall 30, which is the clamping face of the jaws, and by an outer, essentially horizontal wall 31. The faces 30 provide engagement of the jaws at longitudinally spaced points along the rod-like member to be clamped in the socket by side jaws, and they preferably are slightly tilted from the vertical so that the outer edges 32 engage the rod-like member in clamping position.

Jaws 24 and 25 are moved toward clamping position by drawing them together and causing them to slide convergingly on their respective jaw guides 22 and 23. A screw drive for activating the jaws is the preferred arrangement. One or both jaws may be threadedly connected to the threads of a screw shaft. If both jaws are so connected, they may be threadedly connected on screw threads of opposite hand whereby the jaws diverge upon rotation of the shaft in one direction and converge upon shaft rotation in the opposite direction by respective threading action.

The most preferred form of screw drive, however, is that illustrated in the drawings wherein a bolt 33 has a round shank 34 extending through both jaws. Its lower end has threads 35 threaded in a tapped hole 36 in horizontal wall 31 of lower jaw 25. The upper end of shank 34 extends through a hole 37 in the horizontal wall 31 of upper jaw 24 and is freely rotatable therein.

The hexagonal head 38 of bolt 33 projects through a hole 39 in the platform 9 to provide a wrench-engageable member for rotating the bolt to tighten or loosen the jaws as hereinafter described. The shank 34 also passe through slots 40 and 41 in sloping plates 20 and 21, which slots are elongated in the direction of jaw movement. This allows jaws 24 and 25 to slide as aforedescribed when the bolt is turned. The bolt also moves laterally as the jaws slide, and hole 39 must be large enough to avoid binding of head 38 therein in the lateral movement of the latter.

When bolt 33 is threaded downwardly through lower jaw 25, the head 38 and washer 42 press downwardly on upper jaw 24, thereby drawing the jaws toward each other. The jaws thereby move in a converging, inward direction toward socket 13 along guide surfaces 22 and 23 until the edges 32 are wedged tightly against a side 43 of the base of a vertical, shelf mounting post 44 seated in socket 13. In this relationship, post 44 is tightly clamped in socket 13. The socket 13 has a small, horizontal bar fixed to plate 11 at the bottom of the socket at 45 to serve as a stop or abutment for the lower edge of post 44.

Post 44 extends through a socket-aligned opening 46 in platform 9. As illustrated, it is a hollow, metal post having one or more vertical rows of spaced, short, vertical slots 47 in side 43 and/or side 48. The slots 47 receive ears or tabs of one or more shelf-mounting brackets 49 of any suitable construction to afford adjustable mounting structures for a shelf or shelves 50. As illustrated, shelves such as 50 may be mounted at desired heights on sides 44 and/or 48 by brackets 49 to give a versatile, adjustable, shelf mounting structure on a movable pallet. Hollow post 44 in the illustrated embodiment is a pair of back-to-back, three-sided sections 44a and 44b welded together at the juncture along strength-imparting, inwardly projecting ribs 51 and 52.

The invention thus provides a movable, versatile, display unit embodying a movable pallet base with readily mountable and demountable, vertical, shelf-support posts, which in turn adjustably support shelves by adjustable brackets or the like. The respective pallets, posts, shelves and brackets are readily assembled for use and disassembled for convenience of storage. The clamping structures in the socket assemblies have conveniently accessible clamp jaw activators for quick attachment or detachment of the posts in the socket assemblies, and the longitudinally spaced jaw structures and movements thereof through screw motivation constitute secure clamping structures for rod-like members in socket assemblies.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A clamp comprising side walls defining a socket open at a longitudinal end thereof and adapted to receive a rod-like member through said end, one of said side walls embodying a pair of longitudinally spaced, converging, oppositely facing, clamping jaw guides, a clamping jaw slidably mounted on each of said guides, and means for drawing said jaws toward each other to cause said jaws to slide on their respective, converging guides and thereby move said jaws into said socket against a rod-like member to be clamped in said socket.

2. A clamp comprising vertical side walls defining a socket open at the upper end thereof and adapted to receive a rod-like member through said end, one of said side walls having an upper, upwardly-and-outwardly-sloping clamping jaw guide and a lower, downwardly-and-outwardly sloping jaw guide, providing a pair of converging jaw guides, a clamping jaw slidably mounted on each jaw guide, and screw means for drawing said jaws toward each other to cause said jaws to slide on their respective, converging guides and thereby move said jaws into said socket against a rod-like member to be clamped in said socket.

3. A clamp as claimed in claim 2 wherein said screw means is a vertical bolt with its shank extending through both of said jaws, means threadedly connecting one end of said bolt and one of said jaws, and the other end of said bolt having a portion rotatable in and bearing against the other of said jaws as the threading action draws the jaws toward each other.

4. A clamp as claimed in claim 2 wherein said jaw guides are plates respectively having elongated slots extending in the direction of jaw movement on the respective plates, and said means for drawing is a threaded bolt extending through said jaws and said slots.

5. A movable pallet, display structure comprising a pallet base with underframing members supporting a platform thereon, a clamp structure mounted on said underframing beneath said platform, said clamp structure embodying an upwardly opening socket, said platform having an opening above said socket, a vertical post having its base in said socket and extending upwardly through through said opening, movable jaw means on said socket for clamping said base in said socket, a vertical threaded screw member for activating said movable jaw means, and a head portion on said screw member projecting through said platform next to said post.

6. A movable pallet, display structure comprising a pallet base with underframing members supporting a platform thereon, a clamp structure mounted on said underframing beneath said platform, said clamp structure embodying an upwardly opening socket, said platform having an opening above said socket, a vertical post having its base in said socket and extending upwardly through said opening, said clamp structure embodying vertical side walls defining said socket, one of said side walls having an upper, upwardly-and-outwardly-sloping clamping jaw guide and a lower, downwardly-and-outwardly-sloping jaw guide, providing a pair of converging jaw guides, a clamping jaw slidably mounted on each jaw guide, a vertical bolt having its shank extending through both of said jaws, means threadedly connecting the lower end of said bolt and said lower jaw, the upper portion of said shank being rotatable in said upper jaw, a head portion on the upper end of said bolt bearing rotatably slidably against the upper side of said upper jaw, and the upper end of said head portion projecting through said platform next to said post whereby said upper end may be turned to rotate said bolt and thereby tighten or loosen said jaws on said base of said post.

References Cited by the Examiner
UNITED STATES PATENTS

| | | | |
|---|---|---|---|
| 1,046,479 | 12/1912 | McPherson | 108—140 XR |
| 1,319,445 | 10/1919 | Wilson | 108—152 XR |
| 2,185,948 | 1/1940 | Pimm | 182—87 |
| 2,642,250 | 6/1953 | Kasnowich | 248—229 |
| 2,700,520 | 1/1955 | Skubie | 108—53 |
| 2,936,984 | 5/1960 | Skubie | 108—53 |

FRANK B. SHERRY, *Primary Examiner.*

G. O. FINCH, *Assistant Examiner.*